Oct. 31, 1933.    E. P. DU PONT ET AL    1,933,102
MOTOR TRICYCLE
Filed March 18, 1931    2 Sheets-Sheet 1

Oct. 31, 1933.    E. P. DU PONT ET AL    1,933,102
MOTOR TRICYCLE
Filed March 18, 1931    2 Sheets-Sheet 2

Patented Oct. 31, 1933

1,933,102

UNITED STATES PATENT OFFICE 1,933,102

MOTOR TRICYCLE

Eleuthere Paul du Pont, Wilmington, Del., and George Briggs Weaver and Loring Frederick Hosley, Springfield, Mass., assignors to Indian Motorcycle Company, Springfield, Mass., a corporation of Massachusetts Application March 18, 1931. Serial No. 523,468

10 Claims. (Cl. 180—25)

This invention relates to a motor tricycle and has particular reference to a vehicle having a front steerable wheel and two rear wheels, at least one of which is motor-driven.

Heretofore motorcycles have been provided with various forms of attachments intended to lend them greater utility, being arranged for the purpose of conveying parcels, additional passengers, tools, and the like. These arrangements included a chassis or separate vehicle attachment such as a trailer, side car, or the like, but the majority of these arrangements detracted from the mobility of the motorcycle and rendered it cumbersome, expensive and difficult to handle. Contrasted with this former arrangement, the present invention contemplates the conversion of a motorcycle into a motor tricycle of approximately the same wheel base or, if it is preferred not to use a motorcycle, a special chassis, frame or carriage may be constructed in which the three-wheeled arrangement of this invention is embodied.

Referring to the adaptation of a motorcycle to include the present invention, only the frame, front wheel, motor, saddle and other appurtenant parts are employed, excluding specifically the usual rear wheel of the motorcycle. The practice of the invention accordingly consists in attaching to the rear fork of the motorcycle frame at the point usually occupied by the single rear wheel thereof a series of elements which, when assembled, form a two-wheel support for the rear end of the motorcycle frame, at least one wheel of which is driven from the engine and which is adapted to be fitted with a body located behind the operator's saddle. This body preferably includes a hood which encloses the body, extends over the operator's position, and is fitted with a wind-shield connected to the lower portion of the motorcycle frame at the front thereof.

More specifically, the invention includes a pair of plates, one of which is attached to each side of the rear fork of the motorcycle frame, being suitably secured thereto by clamps and having a space between them. Mounted on the outside surface of each of these plates by an offset pivot is an axle housing which may be swung about the offset pivot to vary its position lengthwise of the vehicle, and when the proper position is obtained, the axle housing is locked against further movement by suitable means. Journalled in each of these axle housings is a stub axle, each of which terminates at its inner end between the two plates and carries at its outer end a wheel. The inner end of one of these stub shafts carries a sprocket which is connected to the driving sprocket of the motorcycle engine by means of a chain, the tightness of which may be regulated at will by swinging the corresponding axle housing about its off-set pivot in the manner described. Any such adjustment of the driving axle is compensated for at the other side of the vehicle by similarly adjusting the remaining axle housing, so that both axles are in alignment. Preferably, a brake drum is mounted on the inner end of the other stub axle, and a brake band operated by suitable means engages this brake drum, whereby the vehicle may be braked at will by the operator.

The two plates are secured together to form an integral structure by means of a plurality of tie rods, which also serve the convenient purpose of supporting the body platform, this body platform being located between the two rear wheels and extending in a rearward direction, being suitably braced to be rigid and strong. A body of any desirable form according to its use is mounted upon this platform and between it and the platform are disposed a number of springs to absorb the shocks to which the body is subjected in travel. Thus the body may consist of one or more seats for passengers, a receptacle for parcels and other merchandise, tools, machinery, and the like. Pivoted on this body is a collapsible hood comprising a frame, which, when extended, projects over the operator's position, and a covering for this frame which is carried as a separate unit when the hood is not raised. Suspended from the front edge of this hood is a flexible wind-shield whose lower end is secured to rigid leg guards attached to the front end of the motorcycle frame.

It will be seen that the motor tricycle of this invention is a very compact, light, inexpensive and mobile unit, which has all the advantages of the motorcycle insofar as lightness, mobility, and ready handling are concerned, but has the desirable additional advantage of means for transporting passengers, merchandise, tools, or the like in a rapid, convenient and inexpensive manner.

For a better understanding of this invention, reference is made to the accompanying drawings, in which Figure 1 is a perspective side view of the new motor tricycle of this invention, portions thereof being shown in phantom in the interest of clarity;

In these drawings, numeral 10 designates the frame of a standard motorcycle having the front steerable wheel 11, the motor 12, and the operator's saddle 13 arranged in the usual way. Though a motorcycle frame is employed as one unit of the vehicle, it is to be understood that the invention is not limited thereto, but may include within its scope all vehicles having a longitudinal frame carrying an engine and fitted with a front steerable wheel.

Figure 3:
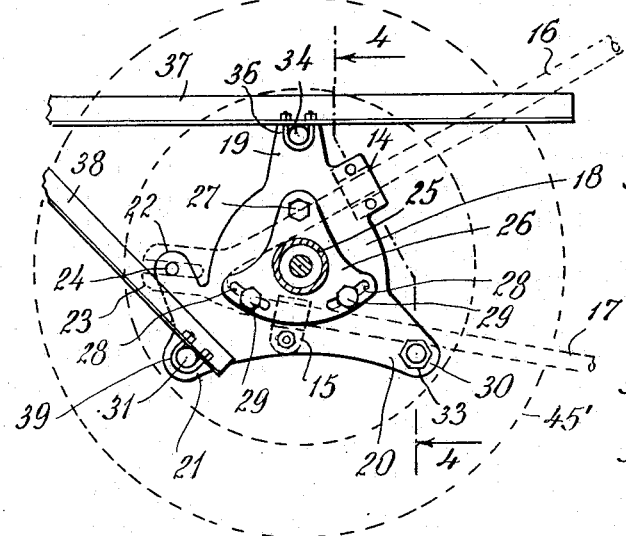
Fig. 3 is a fragmentary section and side view of the rear end of the vehicle as seen along the line 3—3 of Fig. 2.
Figure 4:
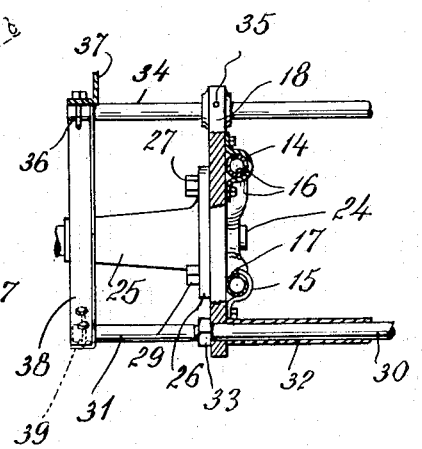
Fig. 4 is a fragmentary transverse section as seen along the line 4—4 of Fig. 3.

Secured by clamps 14 and 15 to the upper and lower struts 16 and 17 of the rear fork of the motorcycle frame, is a supporting member consisting of two plates 18, located at opposite sides of the motorcycle frame and each having the integral ears 19, 20, 21 and 22, as shown particularly in Fig. 3. Ear 22 is so shaped as to engage the rear lug 23 of the motorcycle frame, in which the axle of the rear motorcycle wheel is usually located, and a bolt 24, rivet, screw, or the like, passes through the slot in this lug 23 and forms an additional securing means for locking the plate 18 on the rear fork of the motorcycle frame. These opposite plates 18, though separate units, are accordingly securely clamped to the rear end of the frame in alignment with each other.

Each of these side plates 18 is provided with an aperture located within the crotch formed by the upper and lower struts 16 and 17 of the rear fork of the motorcycle frame, this aperture registering with a tubular axle unit 25 mounted on a plate 26, which serves as a flange for the inner end thereof and lies upon the flat outer surface of the corresponding plate 18. This flange 26 is preferably triangular in shape and is pivoted adjacent its upper edge upon a stud or tap screw 27 secured to the plate 18. The lower edge of flange 26 is provided with two curved slots 28 whose center of curvature is the pivot 27. Passing through each of these slots is a screw or bolt 29 secured in plate 18. It will be seen that by loosening screws or bolts 29 and swinging axle housing 25 about its pivot 27, the lengthwise position of the axle housing 25 may be varied at will. Inasmuch as the opposite axle housing is mounted in the same manner on the opposite plate 18, it will not be necessary to describe it, it being understood that when one of these axle housings 25 is adjusted, the other one should also be adjusted correspondingly in order to maintain the two axle housings 25 in alignment at all times to avoid unnecessary wear of the tires and disalignment of the vehicle wheels.

Figure 2:
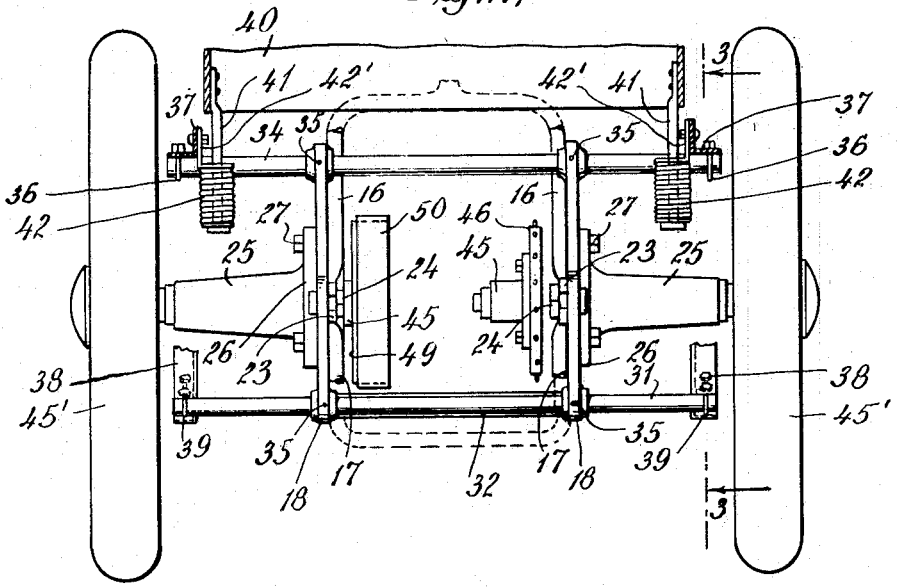
Fig. 2 is a rear view of the tricycle showing the driving mechanism thereof.

Although the two plates 18 are secured in spaced relation on opposite sides of the rear fork of the motorcycle frame, it is desirable to more rigidly connect the two plates 18 together. Accordingly, a pair of tie rods 30 and 31 pass through the lower ears 20 and 21, respectively, of the two opposite plates 18, and a spacer 32, which may conveniently consist of a length of pipe, is slipped over these tie rods, and nuts 33 are tightened down on the outer threaded ends of these tie rods, Fig. 2 illustrating this construction in respect to the front lower tie rod 30. With these tie rods, the two plates 18 are rigidly connected together and form a rigid and strong unit.

Passing through the upper ears 19 of opposite plates 18 is a cross bar 34 suitably secured in position in these opposite plates 18 by means of pins 35 or the like. Secured to the opposite ends of this cross bar 34 by means of U-bolts 36 are the two side rails 37 which preferably consist of angle iron. These rails 37 extend rearwardly and are braced at their rear ends by diagonal struts 38 which extend downwardly and are secured by U-bolts 39 to the projecting ends of tie rod 31, as shown particularly in Figs. 1 and 3. It will be seen that the rails 37 are tied together by cross bar 36 and braced by diagonal struts 38 to form a rigid platform upon which any desirable kind of a body or receptacle may be mounted.

Figure 1:
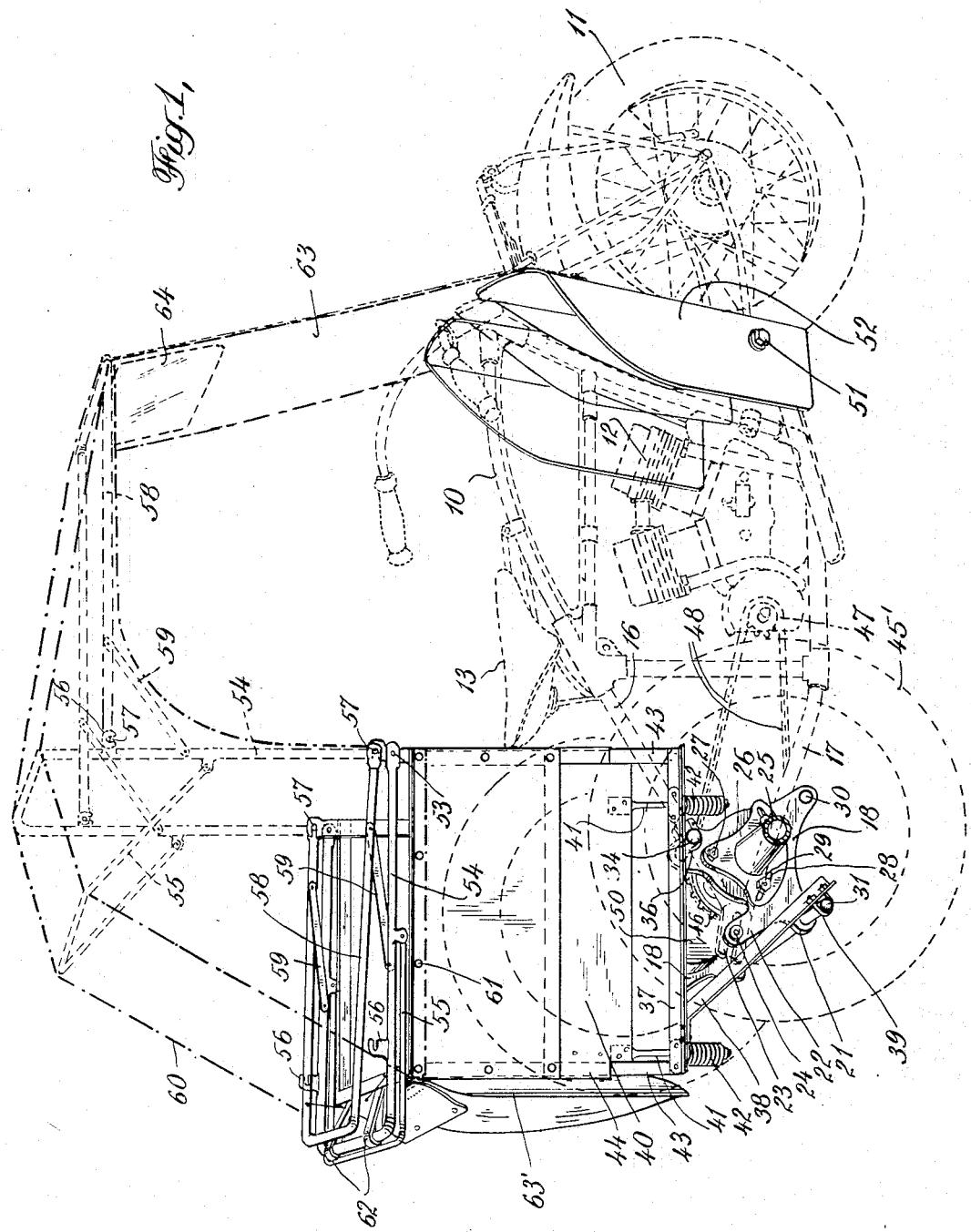

As shown in Figs. 1 and 2, this receptacle may consist of a box-like body 40 supported at each end on brackets 41 which are connected to springs 42 mounted by clips 42' on rails 37. Accordingly, the body 40 is resiliently mounted as the springs 42 absorb the usual road shocks and the like. In order to prevent the body 40 from swaying, upright braces 43 are mounted on the ends of rails 37, and slide in guides 44, mounted on the corresponding corners of the body 40.

Journalled in opposite axle housings 25 are the stub axles 45, to the outer ends of which are secured the wheels 45' for supporting the rear end of the vehicle. The right-hand stub axle 45, as seen in Figs. 2 and 3, is fitted with the sprocket 46 which aligns with the sprocket 47 of the motorcycle engine 12, and is connected thereto by the chain 48. It will be seen that the sprocket 46 lies between the two plates 18, and that the chain 48 is guarded by the structure described.

The inner end of the left-hand stub axle 45 carries the brake drum 49 having the brake band 50, which may be tightened upon the drum 49 to brake the vehicle by the usual type of mechanism, not shown. This brake mechanism also lies between the two plates 18 and is guarded thereby.

Secured to opposite sides of the front of the motorcycle frame 10 by means of a bolt 51 are the metal leg guards 52 which extend upwardly alongside of the front wheel 11 of the vehicle and serve as combination wind, injury, and splash guards for the legs of the operator.

Pivoted on the lug 53 mounted on the front edge of the body 40 is the frame of the hood, consisting of the bail 54 adapted to be swung to the upright position shown in phantom in Fig. 1 and carrying a small bail 55 adapted to be swung rearwardly to the position shown in phantom. The bail 54 carries lugs 56 at opposite sides, in each of which is adapted to be locked the end pin 57 of the bail 58 which is connected to bail 54 by links 59, and is adapted to be unhooked from brackets 53 and swung about its links 59 so that its pins 57 lodge in the lugs 56, as shown in phantom in Fig. 1. It will be seen that this collapsible hood frame, when raised, extends over the body and bail 58 extends forwardly over the operator's position. A suitable waterproof cover 60 shown in phantom in Fig. 1 is adapted to be secured over the frame by means of separable fasteners 61 mounted upon the body 40. When the hood frame is collapsed as shown in Fig. 1, it is held down by straps 62 mounted on the body 40 and the waterproof covering 60 is adapted to be folded up and inserted in the pouch 63' mounted on the rear of the body 40.

Suspended from the front edge of bail 58 when the hood is in raised position, is the flexible windshield 63 having the window 64 in line with the operator's vision. The lower end of this windshield 63 is adapted to be secured to the leg guards 52 in a suitable way. Side curtains, not shown, may be secured jointly to the hood and wind-shield 63 so as to completely enclose the operator, these side curtains and the windshield 63 also being adapted to be folded up and placed in pouch 63' when not in use. The leg guards 52 are permanently secured to the motorcycle frame.

The assembly of the parts constituting the preferred embodiment of this invention will be understood from the foregoing description, and though these parts are preferably attached to the existing motorcycle frame 10 after the rear wheel has been removed therefrom or before it has been emplaced thereon, the parts do not in themselves constitute a separate chassis or vehicle unit, but only form the motor tricycle of this invention when assembled upon the motorcycle frame in the manner described. When it is desired to adjust the tightness of chain 48, it is only necessary to loosen studs 29 which pass through the slots 28 of the flange 26 of each axle housing 25, swing the corresponding housing around its pivot 27 until the chain 45 has the proper degree of tightness, and then tighten down studs 29 to lock the axle housing in this position. The opposite axle housing should be adjusted in the same way to maintain the two axles in alignment. It will be seen that this adjustment does not appreciably change the height of the rear end of the vehicle, so that the proper clearance with the road surface is maintained, this adjustment serving only to move the axles lengthwise of the vehicle a slight amount to adjust the tightness of the chain 48 to compensate for wear or the like.

It will be seen that the motorcycle frame is not altered in any way whatever, the plates 18 being simply secured by clips 14 and 15 and bolt 24 to the existing motorcycle frame, and being removable therefrom in the same way if it is desired to reconvert the vehicle into a standard motorcycle. Thus the plates 18 and their appurtenant parts may be distributed as separate units, whereby the standard motorcycle may be converted into a standard tricycle with ease and without other change. The motorcycle tricycle thus secured is light, compact, inexpensive, and as mobile as the original motorcycle, while having the additional advantages of providing means for transporting passengers, merchandise, tools or the like with ease, convenience, and rapidity.

While a preferred embodiment of the invention has been described and illustrated herein, it is to be understood that this invention is not to be limited thereby, but is susceptible of many changes in form and detail within its scope.

We claim:

1. In a motor tricycle, the combination of a frame having a front steerable wheel and an engine, a supporting member secured to the rear of said frame, opposite rear wheels mounted on the member, individual journals for said wheels mounted upon said member, a driving connection between one of said rear wheels and said engine, and means independent of the other wheel for adjusting the journal of said one wheel about an axis spaced from the axis of the journal to adjust said driving connection.

2. In a motor tricycle, the combination of a frame having a front steerable wheel and an engine, a supporting member secured to the rear of said frame, opposite rear wheels mounted on the member, journals for said rear wheels mounted upon said member, a driving connection between said engine and one of said rear wheels, and means independent of the other wheel for adjusting the journal of said one wheel about an axis spaced from the axis of the journal to adjust said driving connection.

3. In a motor tricycle, the combination of a frame having a front steerable wheel and an engine, a supporting member secured to the rear of said frame, an axle housing pivoted on one side of said member and adapted to be swung about its pivot to adjust the lengthwise position thereof, a stub axle therein, driving connections between said axle and said engine, and an independent second housing bearing an axle and wheel mounted upon the opposite side of said member.

4. In a motor tricycle, the combination of a frame having a front steerable wheel and an engine, a supporting member secured to the rear of said frame, a pair of aligned axle housings pivoted on said member, means for independently adjusting said housings about their pivots to vary the lengthwise positions thereof, stub axles therein, opposite wheels on said axles, and a driving connection between at least one of said axles and said engine.

5. In a motor tricycle, the combination of a frame having a front steerable wheel and an engine, a plate secured to each side of said frame at the rear end thereof, a tubular axle housing rigidly secured at one end to each of said plates and extending laterally therefrom, a stub axle journalled in each housing, wheels thereon, and a driving connection between said engine and one of said axles.

6. In a motor tricycle, the combination of a frame having a front steerable wheel and an engine, a plate secured to each side of said frame at the rear end thereof, a tubular axle housing connected at one end to each of said plates and extending laterally therefrom, means for adjusting said connections to move the corresponding axle housing relatively to the corresponding plate, a stub axle journalled in each axle housing, and a driving connection between the engine and one of said axles.

7. In a motor tricycle, the combination of a frame having a front steerable wheel and an engine, a plate secured to each side of said frame at the rear end thereof, a tubular axle housing pivoted eccentrically at one end on each of said plates and extending laterally therefrom, means for adjusting said axle housing about the pivot relatively to the corresponding plate, a stub axle in each axle housing, and driving connections between the engine and one of said axles.

8. In a motor tricycle, the combination of a frame having a front steerable wheel and an engine, a plate secured to each side of said frame at the rear end thereof, an axle housing mounted on each of said plates, a stub axle journalled in each of said housings, opposite wheels thereon, driving means extending from said engine and connected to the inner end of one axle between said plates, and a brake drum on the inner end of the other axle between said plates.

9. In a motor tricycle, the combination of a frame having a front steerable wheel and an engine, a plate secured to each side of said frame at the rear end thereof, a body supported jointly by said plates, an axle housing rigidly mounted at one end to each of said plates and extending laterally therefrom, a stub axle journalled in each of said housings, a wheel on the outer end of each of said axles, a sprocket on the inner end of one of said axles, a chain connecting said engine and sprocket, and means for adjusting the corresponding axle housing relatively to the corresponding plate to adjust said chain.

10. In a motor tricycle, the combination of a frame having a front steerable wheel and an engine, a member secured to the rear end of said frame and having substantially flat opposite sides, a pair of axle housings each having a flange engaging a flat side of said member and extending laterally therefrom in substantial alignment with each other, an offset pin securing the flange of at least one of said axle housings to the corresponding side of said member, said one axle housing being adjustable on said member about said offset pin as a pivot, means passing through the flange of said one axle housing for locking the same on said member in any adjusted position, and a wheel and axle combination supporting said axle housings and driven by the engine.

ELEUTHERE PAUL DU PONT.
GEORGE BRIGGS WEAVER.
LORING FREDERICK HOSLEY.